Patented June 21, 1949

2,474,139

UNITED STATES PATENT OFFICE 2,474,139

MICROBIAL FERMENTATION OF ACID HYDROLYZED CARBOHYDRATE MASHES

Seymour S. Block, Louisville, Ky., assignor to Joseph E. Seagram & Sons, Inc., Shively, Ky., a corporation of Indiana No Drawing. Application June 3, 1944, Serial No. 538,692

7 Claims. (Cl. 195—96)

The present invention relates to the microbial fermentation of acid hydrolyzed carbohydrate mashes.

It is common practice to effect the acid hydrolysis of various carbohydrate plant mashes such as grain, wood, corncob bagasse, etc., and thereby condition them for fermentation by the action of suitable bacteria 2, 3 butelene glycol, butyl alcohol, lactic acid and a wide range of other well-known products. Unfortunately, such acid hydrolyzed mashes do not act uniformly during the fermentation. For example, one mash will ferment at normal or expected rates and fermentation efficiencies and produce normal or expected yields. In other apparently identical mashes, varying degrees of subnormal yields, fermentation rates and fermentation efficiencies are encountered. This tendency toward subnormality occurs with greater frequency as the cooking temperature, cooking time and degree of acidity increase.

It is quite possible, in subnormal cases, that the hydrolyzing process acts, for some unknown reason, on the sugar content of the mash to produce aldehyde compounds, such as furfural or hydroxymethylfurfural, which are more or less toxic to the active micro-organism, although yeast cells are not substantially affected thereby. Whatever the cause may be, the subnormality is not yet predictable in occurrence or extent and is a constant source of annoyance and loss.

The principal object of the present invention is to eliminate or reduce this source of annoyance and loss and, more particularly, to make possible the production of acid hydrolyzed mashes which will act normally during the bacterial fermentation.

Another object is to eliminate or reduce, in substantial measure, the development of toxicity in acid-hydrolyzed fermentation mediums and thereby promote, to a large degree, microbial growth, product yield and fermentation efficiency.

A further object is to provide a novel, simple and inexpensive treatment for acid hydrolyzed mashes which, during the fermentation, either prevents the development of compounds toxic to bacteria or otherwise nullifies their effect.

I have found that when the bacterial fermentation of acid hydrolyzed mash is conducted in the presence of a "reducing agent" which contains sulphur, such as sodium bisulphite, the toxicity to bacteria apparently is reduced to insignificant proportions or the mash is otherwise placed and maintained in a condition favoring microbial growth, high yield and high fermentation efficiency. The action by which the sodium bisulphite (NaHSO$_3$) accomplishes this result is not definitely known. It is known to have both aldehyde combining properties and reducing properties and it may be that either or both of these properties enter into whatever action may occur. Whatever its action may be, sodium bisulphite, which gives sulfurous acid in solution, is extremely efficacious in combating the cause of subnormality in acid hydrolyzed mashes since a very small quantity added to the hydrolyzed mash is entirely sufficient to insure uniform bacterial fermentation conditions unfailingly. For example, with an acid hydrolyzed corn mash, which is to be fermented by *A. aerogenes*, the addition of 0.05 to 0.10 grams to 100 c. c. of medium of sodium bisulphite is sufficient, not only to insure good fermentation conditions, but also to bring about yields which are higher and much more rapidly produced than those heretofore obtained from untreated mashes of like character.

In place of sodium bisulphite, other sulphur containing "reducing agents" or compounds giving sulfurous acid in solution may be employed, such as sodium metabisulphite (NaHS$_2$O$_5$) sodium sulphite (Na$_2$SO$_3$) sulfurous acid (H$_2$SO$_3$) and sulfur dioxide (SO$_2$). In addition, I have found that other sulphur containing "reducing agents," which do not give sulfurous acid in solution, may be employed, such as sodium thiosulphate (Na$_2$S$_2$O$_3$) and cysteine (C$_3$H$_7$O$_2$S).

Of these sulphur containing "reducing agents," sodium bisulphite appears to be the most effective, while those which give sulfurous acid in solution are more effective than those which do not. These agents are identified herein as a group by the term "sulphur containing reducing agents" but it will be understood that this term is not used to indicate that they operate as reducing agents since their particular mode of operation is not yet definitely known. I believe that the degree of toxicity to bacteria may depend upon the starch or sugar content of a mash that is to say that where the conditions are such as to produce toxicity in one mash of one starch content the same conditions in mash, which is the same except for a higher starch content, is likely to produce a greater degree of toxicity. Also, it may be noted that sodium bisulphite, for example, is toxic and should not be used in excess so as to remain in the mash as free sodium bisulphite. However it is impossible to specify the minimum amount since different concerns use different mash formulas. It is a simple laboratory matter to determine what amount of any of these agents is optimum for any one specific mash and since the laboratory procedure is well known it is not herein recited.

Having described my invention, I claim:

1. In the fermentation of starch mashes by bacteria, the steps which comprise acid hydrolyzing the starch to produce a high conversion thereof to fermentable sugars, and adding to the hydrolyzed product prior to fermentation thereof a material from the group consisting of sodium bisulphite, sodium metabisulphite, sodium sulphite, sulfurous acid, sulfur dioxide, sodium thiosulphate and cysteine, then adding the bacteria.

2. The method of claim 1 wherein the material is sodium bisulfite.

3. The method of claim 1 wherein the material is sodium bisulfite and is added in an amount between 0.05 to 0.10 gram per 100 cc. of mash.

4. In the fermentation of corn mash by bacteria, the steps which comprise acid hydrolyzing the starch to produce a high conversion to fermentable sugars, and adding to the hydrolyzed product prior to fermentation a material from the group consisting of sodium bisulphite, sodium metabisulphite, sodium sulphite, sulfurous acid, sulfur dioxide, sodium thiosulphate and cysteine, then adding the bacteria.

5. In the fermentation of starch mashes by bacteria, the steps which comprise acid hydrolyzing the starch to produce a high conversion thereof to fermentable sugars, and adding to the hydrolyzed product prior to fermentation thereof a material from the group consisting of sodium bisulphite, sodium metabisulphite, sodium sulphite, sulfurous acid, sulfur dioxide, sodium thiosulphate and cysteine, then adding A. aerogenes bacteria.

6. In a method of fermenting a starch mash acid hydrolized to produce a high conversion thereof to fermentable sugars with bacteria, the improvement which comprises, adding cysteine.

7. In a method of fermenting a corn mash acid hydrolized to produce a high conversion thereof to fermentable sugars with bacteria, the improvement which comprises adding cysteine.

SEYMOUR S. BLOCK.

REFERENCES CITED

The following references are of record in the file of this patent:

UNITED STATES PATENTS

| Number | Name | Date |
| --- | --- | --- |
| 88,004 | Beanes | Mar. 23, 1869 |
| 490,538 | Brown | Jan. 24, 1893 |
| 600,708 | Boot | Mar. 15, 1898 |
| 1,580,500 | Kusserow | Apr. 13, 1926 |
| 2,348,451 | Christensen | May 9, 1944 |

OTHER REFERENCES

Hopkins & Krause, Biochemistry Applied to Malting and Brewing, Allen and Unwin Ltd., page 243.